United States Patent
Kato

(10) Patent No.: US 8,452,355 B2
(45) Date of Patent: May 28, 2013

(54) SLIDE DEVICE

(75) Inventor: Akihiko Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 135 days.

(21) Appl. No.: 13/061,293

(22) PCT Filed: Sep. 15, 2009

(86) PCT No.: PCT/JP2009/066575
§ 371 (c)(1),
(2), (4) Date: Feb. 28, 2011

(87) PCT Pub. No.: WO2010/044337
PCT Pub. Date: Apr. 22, 2010

(65) Prior Publication Data
US 2011/0163645 A1      Jul. 7, 2011

(30) Foreign Application Priority Data
Oct. 16, 2008   (JP) ................................ 2008-267740

(51) Int. Cl.
*H04M 1/00*          (2006.01)
(52) U.S. Cl.
USPC ....................................................... 455/575.4
(58) Field of Classification Search
USPC ....................................................... 455/575.4
See application file for complete search history.

(56) References Cited

U.S. PATENT DOCUMENTS

| 2005/0162121 A1* | 7/2005 | Chan .............................. 320/101 |
| 2005/0164753 A1 | 7/2005 | Kato |
| 2007/0091555 A1 | 4/2007 | Lee |
| 2009/0029748 A1* | 1/2009 | Lee ............................ 455/575.4 |

FOREIGN PATENT DOCUMENTS

| JP | 11-55376 A | 2/1999 |
| JP | 2003179674 A | 6/2003 |
| JP | 2003319042 A | 11/2003 |
| JP | 2006157465 A | 6/2006 |
| JP | 2006186577 A | 7/2006 |
| JP | 2006270804 A | 10/2006 |

OTHER PUBLICATIONS

International Search Report for PCT/JP2009/066575 mailed Jan. 12, 2010.
European search report for EP09820515.6 mailed on Oct. 5, 2012.

* cited by examiner

*Primary Examiner* — Alexander Jamal

(57) ABSTRACT

An object of the present invention is to provide a slide device wherein slide sections can be opened and closed, while concealing a torsion spring. A slide device includes a first case, a second case, a spring which is arranged between the first case and the second case and assists opening and closing of the first and second cases; and a shielding member which conceals the spring, wherein the shielding member is arranged in a position to conceal the spring when the first case and the second case are in an open state and is arranged between the first case and the second case when the first case and the second case are in a close state.

7 Claims, 11 Drawing Sheets

Fig.2A
Fig.2B
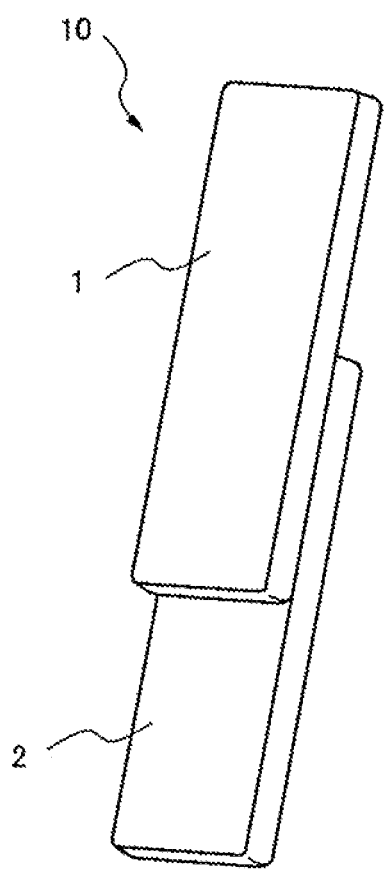
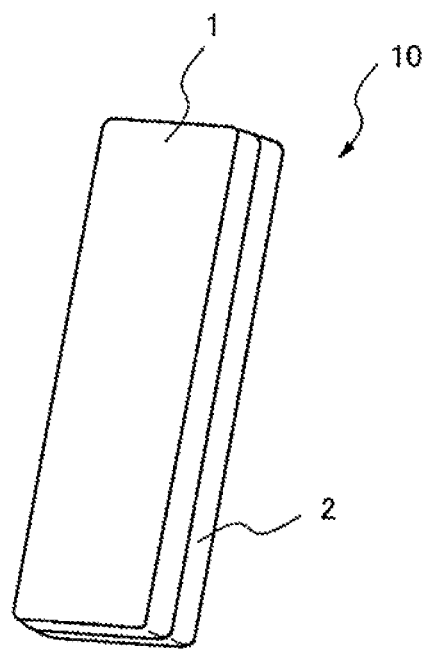

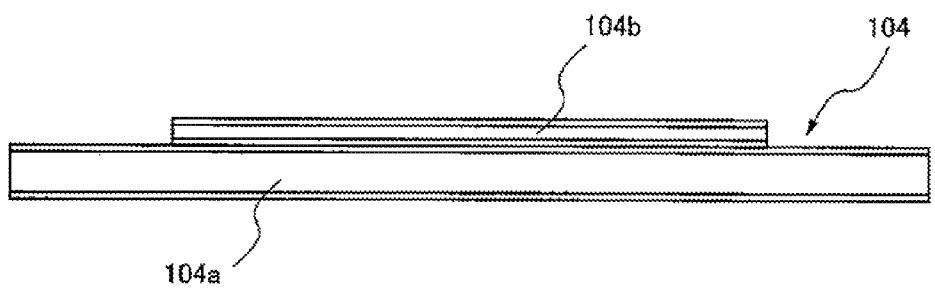
Fig.8A
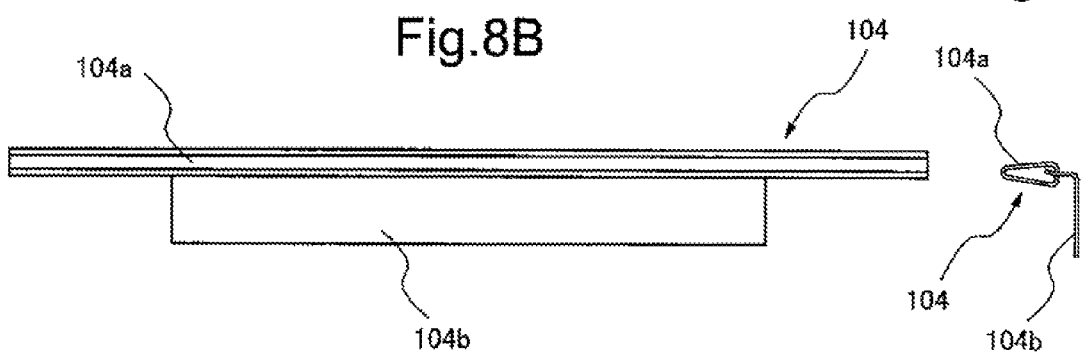
Fig.8B
Fig.8C

SLIDE DEVICE

This application is the National Phase of PCT/JP2009/066575, filed Sep. 15, 2009, which is based upon and claims the benefit of priority from Japanese patent application No. 2008-267740, filed on Oct. 16, 2008, the disclosure of which is incorporated herein in its entirety by reference.

TECHNICAL FIELD

The present invention relates to a slide device including a member which can slide.

BACKGROUND ART

In recent years, the spread of a mobile terminal such as a cellular phone is remarkable. Of them, a slide type mobile terminal device of a shape that makes two cases slide in order to improve portability and operability, is widely used.

A mobile terminal device of such slide type, for example, is disclosed in patent literatures 1 and 2.

Patent literature 1: Japanese Patent Laid-Open No, 2003-179674

Patent literature 2: Japanese Patent Laid-Open No. 2003-319042

DISCLOSURE OF INVENTION

Technical Problem

However, a slide type mobile terminal device disclosed in patent literature 1 and patent literature 2 may be used in a state that a slide is incomplete. That is, some operators use the mobile terminal device without performing slide operation until a slide is completed completely. In this case, a problem that a joint of two cases of a mobile terminal device is easy to be destroyed arises.

Further, two cases of a slide type mobile terminal device disclosed by patent literature 1 and patent literature 2 slide only by operator's operation. Therefore, a problem that comfortable operation feeling cannot be given to an operator arises.

Then, disposing a torsion spring between two cases and assisting the slide operation by the torsion spring are considered. In particular, for a mobile terminal device with long sliding length, a sliding method using a torsion spring is suitable.

The slide type mobile terminal device with torsion spring gives a comfortable operation feeling because of the torsion spring. Moreover, a slide can be assisted so that a relative position of two cases will be most suitable by a torsion spring.

FIG. 9 is a perspective view showing an exterior appearance of a slide type mobile terminal device with torsion spring as a reference example.

A mobile terminal device 200 shown in FIG. 9 is composed of two cases of a case 201 and a case 202. Further, a slide groove 202a is arranged between the case 201 and the case 202. Moreover, a torsion spring 203 is arranged in slide groove 202a.

In the mobile terminal device 200 the torsion spring 203 is visually recognized from an opening between the case 201 and the case 202. That is, in case of a slide with a torsion spring, it is necessary to make space for a spring movable part. Therefore, because of the structure of the slide, the torsion spring 203 can be visually recognized from an opening between the cases.

Thus, in the mobile terminal device 200 shown in FIG. 9, the torsion spring 203 can be identified from the exterior appearance. Therefore, the exterior appearance is not good. Moreover, a problem of design constraints arises.

Further, by being able to identify the torsion spring 203 from the exterior appearance, an occasion to be contacted directly increases for the torsion spring 203. As a result, a problem of rising probability of a defect is caused.

Accordingly, it is considered to make a torsion spring not to being visually recognized., by using a shielding member.

FIG. 10 is a side cross-sectional view of a reference example of a shielding member which is set for preventing the torsion spring from being visually recognized from an opening between two cases.

FIG. 11 is a side cross-sectional view showing a state of being impossible to be closed of two cases shown in FIG. 10.

In FIG. 10 and FIG. 11, a mobile terminal device 300 of the reference example is composed of two cases, a case 301 and a case 302. A slide groove 302a is arranged between the case 301 and the case 302. Moreover, a torsion spring 303 is arranged in the slide groove 302a.

The mobile terminal device 300 has a shielding member 302b casting with the case 302 in a mold and the like. Then, the torsion spring 303 is concealed by the shielding member 302b from an opening between the case 301 and the case 302. Therefore, the torsion spring 303 is not visually recognized from an opening between the case 301 and the case 302.

However, the mobile terminal device 300 can not to be closed when the case 301 and the case 302 slide, as shown in FIG. 11. This is because the shielding member 302b is in contact with a shoulder part 301a of the case 301 when the mobile terminal device 300 tries to be closed. That is, if the torsion spring 303 is tried to be concealed simply, a space where a member for blindfold (shielding member 302b) can exist in will change as opening and closing of a case. Therefore, the shielding member 302b is interfered with a case (shoulder part 301.a of the case 301). Thus, it was difficult to conceal the torsion spring 303.

The present invention has been made in view of the above-mentioned point. That is, an object of the present invention is to provide a slide device wherein a slide can be opened and closed while concealing a torsion spring.

Means of Solving the Problems

The slide device of present invention comprises a first case, a second case, a spring which is arranged between the first case and the second case and supports opening and closing of the first and second cases, and a shielding member which conceals the spring, wherein the shielding member is arranged in a position to conceal the spring when the first case and the second case are in the open state and be arranged between the first case and the second case when the first case and the second case are in the close state.

Advantageous Effects of Invention

According to the present invention, a slide device wherein a slide can be opened and closed while concealing a torsion spring can be provided.

BRIEF DESCRIPTION OF DRAWINGS

FIG. 2 is a perspective view showing a composition of a mobile terminal device according to a second embodiment of the present invention wherein (a) shows the open state of a slide, and (b) shows the close state of a slide.

FIG. 8 is a diagram showing the shielding member shown in FIG. 6 and FIG. 7, wherein (a) is a plan view of the shielding member, and (b) is a front view of the shielding member, and (c) is a right side view of the shielding member.

Figure 1:
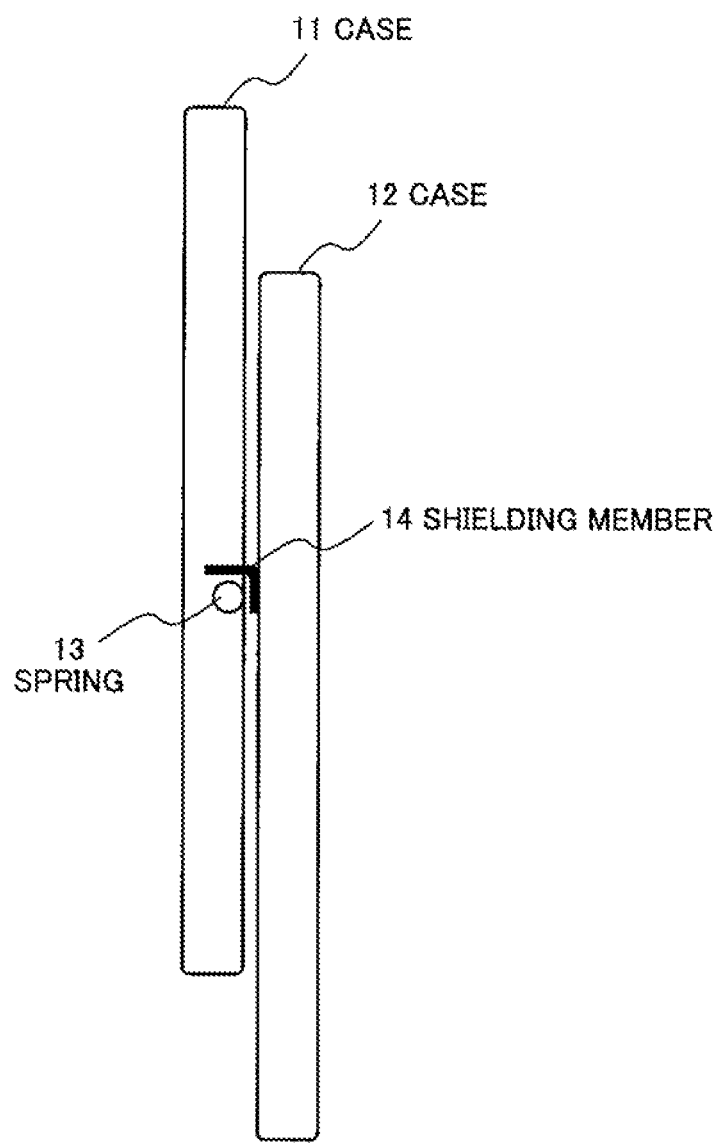
FIG. 1 is showing an example of composition of a slide device according to a first embodiment of the present invention.

DESCRIPTION OF THE CODES 1, 2, 11, 12, 101, 102, 201, 202, 301 and 302 case
1a shoulder part of case 1
2a, 102a, 202a and 302a slide groove
3, 103, 203 and 303 torsion spring
4, 14, 104 and 302b shielding member
4a movable plate part
4b supporting shaft plate part
10, 100, 200 and 300 mobile terminal device
13 spring
101a shoulder part of case 101
104a movable part
104b supporting shaft part
301a shoulder part of case 301

BEST MODE FOR CARRYING OUT THE INVENTION

The embodiment of the present invention will be described with reference to the drawings. However, the embodiments do not limit the technical scope of the present invention.

The First Embodiment

The first embodiment of a slide device of the present invention will be described referring to FIG. 1.

A slide device in the present embodiment comprises a case 1, a case 12, a spring 13 and a shielding member 14.

The spring 13 is arranged between the case 11 and the case 12. Further, the spring 13 assists opening and closing of the case 11 and the case 12.

The shielding member 14 conceals the spring 13. Further, the shielding member 14 is transformed according to the opening and closing of the case 11 and the case 12.

When the case 11 and the case 12 are in an open state, the shielding member 14 conceals the spring 13 in order to prevent the appearance to be visually recognized. Further, when the case 11 and the case 12 slide and become a close state, the shielding member 14 transforms.

Thus, in the present embodiment, the shielding member 14 conceals an opening when two cases 11 and 12 slide and open. Therefore, the spring does not expose to the exterior appearance. Thus, an advantage on the design can be realized by a cheap configuration. Moreover, though it conceals the spring 13, a slide can be opened and closed.

The Second Embodiment

The second embodiment of a slide device of the present invention will be described.

A slide device in the present embodiment is the slide type mobile terminal device with a torsion spring.

FIG. 2 is a perspective view showing a composition of a mobile terminal device 10 according to the present embodiment. In FIG. 2, (a) shows the open state of a slide. Further, FIG. 2 (b) shows the close state of a slide.

Figure 3:
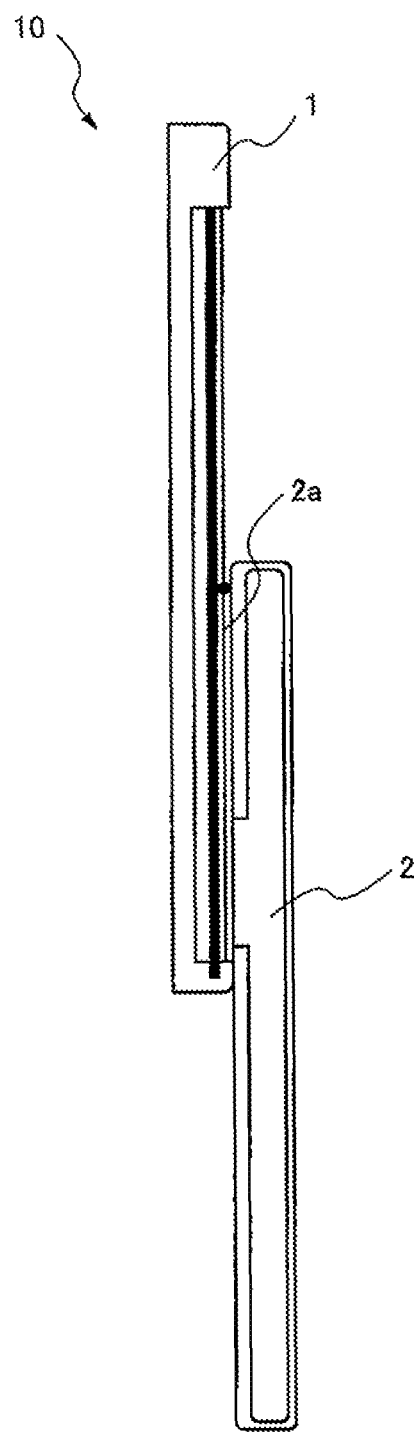
FIG. 3 is a side cross-sectional view of an open state of a slide of the mobile terminal device shown in FIG. 2.

FIG. 3 is a side cross-sectional view of an open state of a slide of the mobile terminal device 10 shown in FIG. 2.

Figure 4:
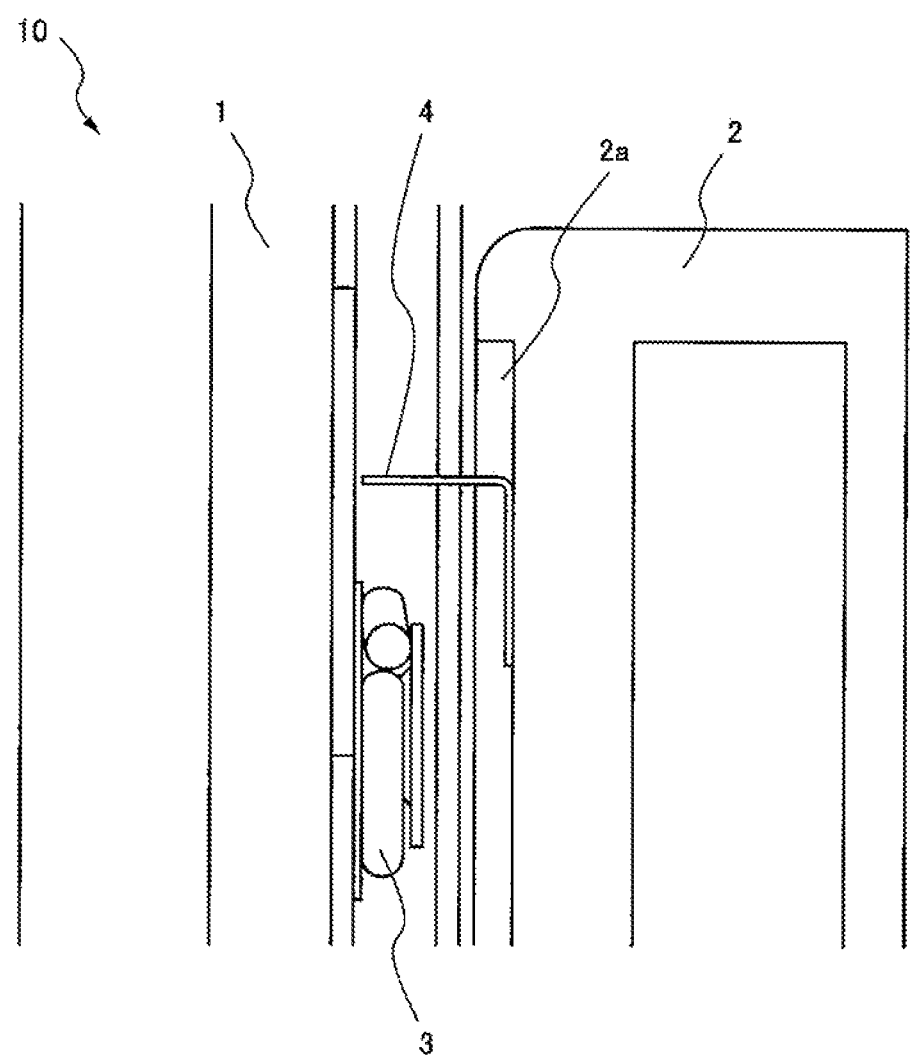
FIG. 4 is a side cross-sectional view showing the open state of a slide of the mobile terminal device shown in FIG. 2, by expanding, a part of a shielding member.

FIG. 4 is a side cross-sectional view showing the open state of a slide of the mobile terminal device 10 shown in FIG. 2, by expanding a part of a shielding member.

Figure 5:
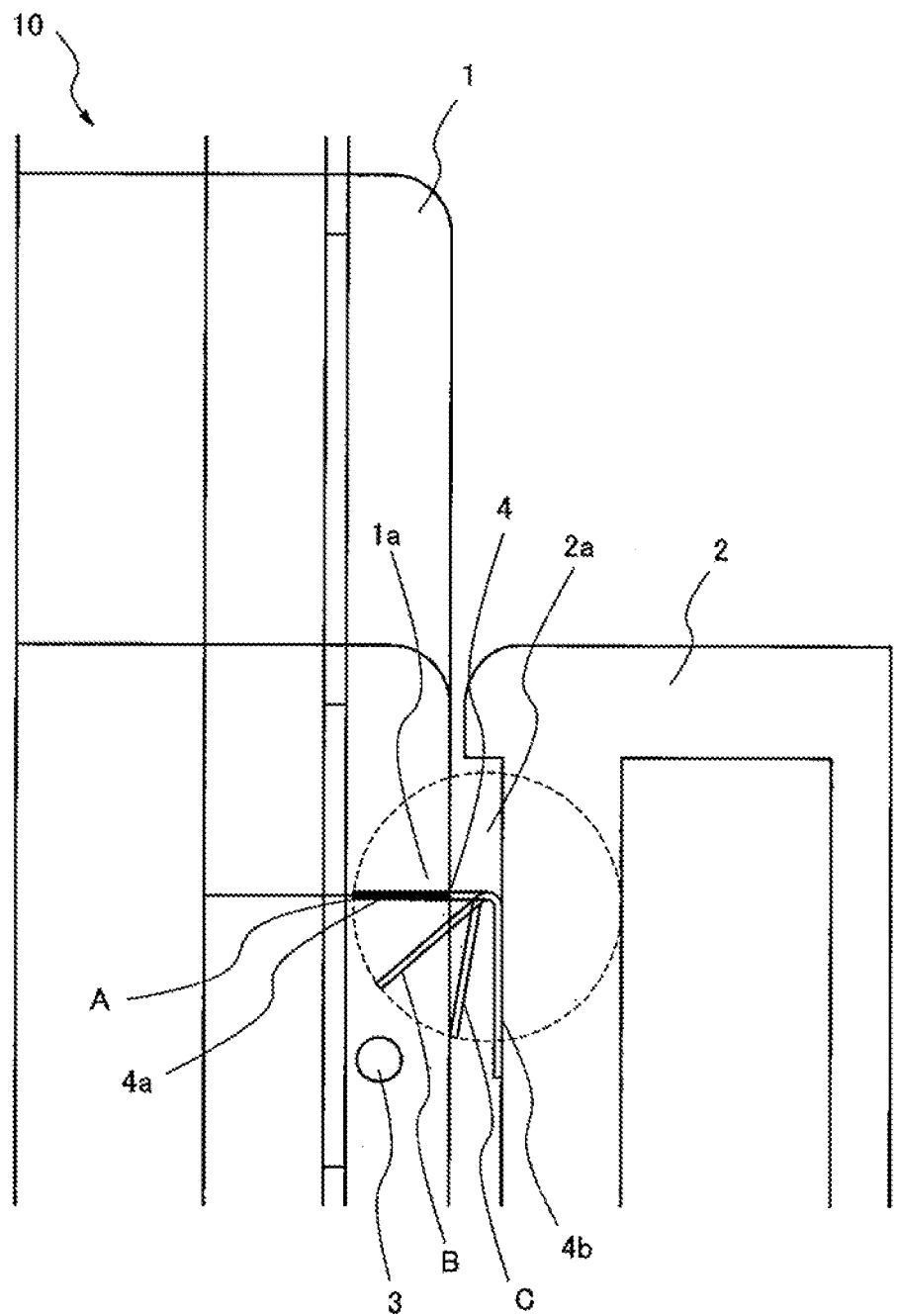
FIG. 5 is a side cross-sectional view illustrating an operation of the shielding member shown in FIG. 4, when closing a slide.

FIG. 5 is a side cross-sectional view illustrating an operation of the shielding member shown in FIG. 4, when closing a slide.

As shown in FIGS. 2 (a) and (b), the mobile terminal 10 of the present embodiment has two cases, a case 1 and a case 2. Further, it is constituted to open and close by sliding the case 1 and the case 2.

Further, as shown in FIG. 3, a slide groove 2a is arranged between the case 101 and the case 102 of the mobile terminal device 10 in order to reserve space required for sliding.

Furthermore as shown in FIG. 4, a torsion spring 3 is arranged between the case 1 and the case 2. The torsion spring 3 assists the sliding of the case 1 and the case 2. The mobile, terminal device 10 has a shielding member 4 which is in an L shape. The shielding member 4 conceals the torsion spring 3 which is in the gap between the case 1 and the case 2, in order to prevent the appearance to be visually recognized. The shielding member 4 may be made of metal or resin.

The shielding member 4 includes a movable plate part 4a and a supporting shaft plate part 4b as shown in FIG. 5. The movable plate part 4a and the supporting shaft plate part 4b are of the flat plate shapes respectively. Further, the movable plate part 4a and the supporting shaft part 4b form an L shape. Furthermore, the supporting shaft plate part 4b is fixed to the case 2. On the other hand, the movable plate part 4a moves to change the angle of the L shape according to the slide situation of the case 1 and the case 2. That is, the movable plate part 4a and the supporting shaft plate part 4b are constituted to have flexibility. In other words, the movable plate part 4a and the supporting shaft plate part 4b are transformed when a power is added to them, and have a spring characteristics (elastic recovery) of returning to the original shape when the power is removed from them.

As a result, the shielding member 4 is transformed according to the opening and closing of a slide of the case 1 and the case 2.

When the case 1 and the case 2 are in open state, the movable plate part 4a is in position A shown in FIG. 5. Therefore, the shielding member 4 conceals the torsion spring 3 in order to prevent the appearance to be visually recognized.

When the case 1 and the case 2 slide and become a close, state, the movable plate part 4a is pushed by a shoulder part is of the case 1, and bends. Then, the movable plate part 4a is transformed by moving from position A to position B and position C. On the other hand, when the case 1 and the case 2 slide and change from a close state to an open state, the movable plate part 4a is transformed by moving from position C to position B and position A because of a spring characteristics elastic recovery) of the movable plate part 4a and the supporting shaft plate part 4b.

Thus, in the present embodiment, the shielding member 4 conceals an opening when two cases slide and open. Therefore, a torsion spring does not expose to the exterior appearance. Thus, advantage on the design can be realized by a cheap configuration.

Moreover, a slide can be opened and closed while concealing a torsion spring.

Further, although a mobile terminal device slides vertically in the present embodiment, it is not limited thereto. That is, it may be a mobile terminal device which slides sideways.

Further, a plurality of shielding members 4 may be used to one case.

Furthermore, although a torsion spring is used in the present embodiment, it is not limited thereto. That is, other springs may be used.

The Third Embodiment

Next, a mobile terminal device in the third embodiment of the present invention will be described.

Figure 6:
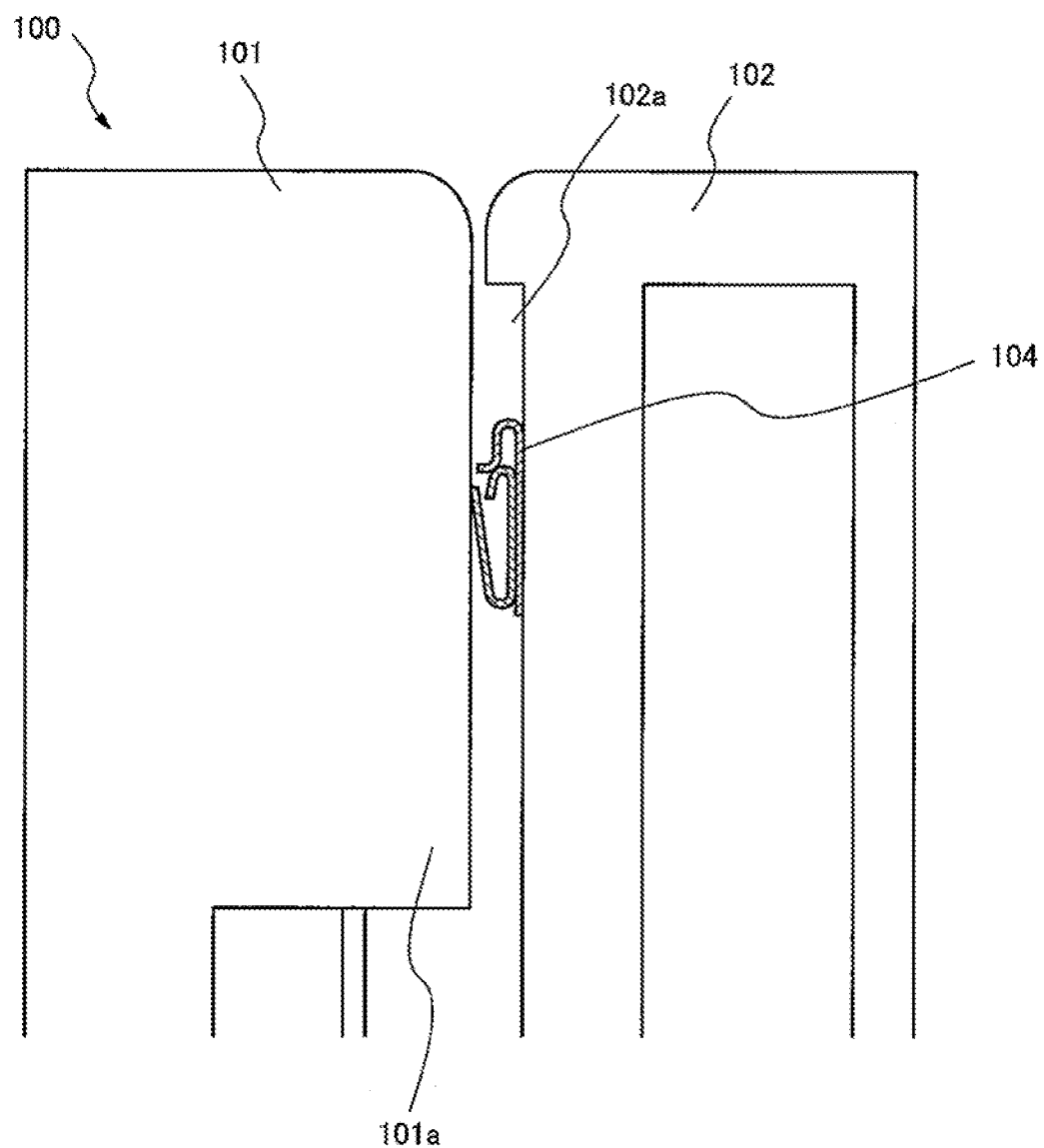
FIG. 6 is a side cross-sectional view showing a close state of a slide of a mobile terminal device according to a third embodiment of the present invention.

FIG. 6 is a side cross-sectional view showing a close state of a slide of a mobile terminal device 100 of the present embodiment.

Figure 7:
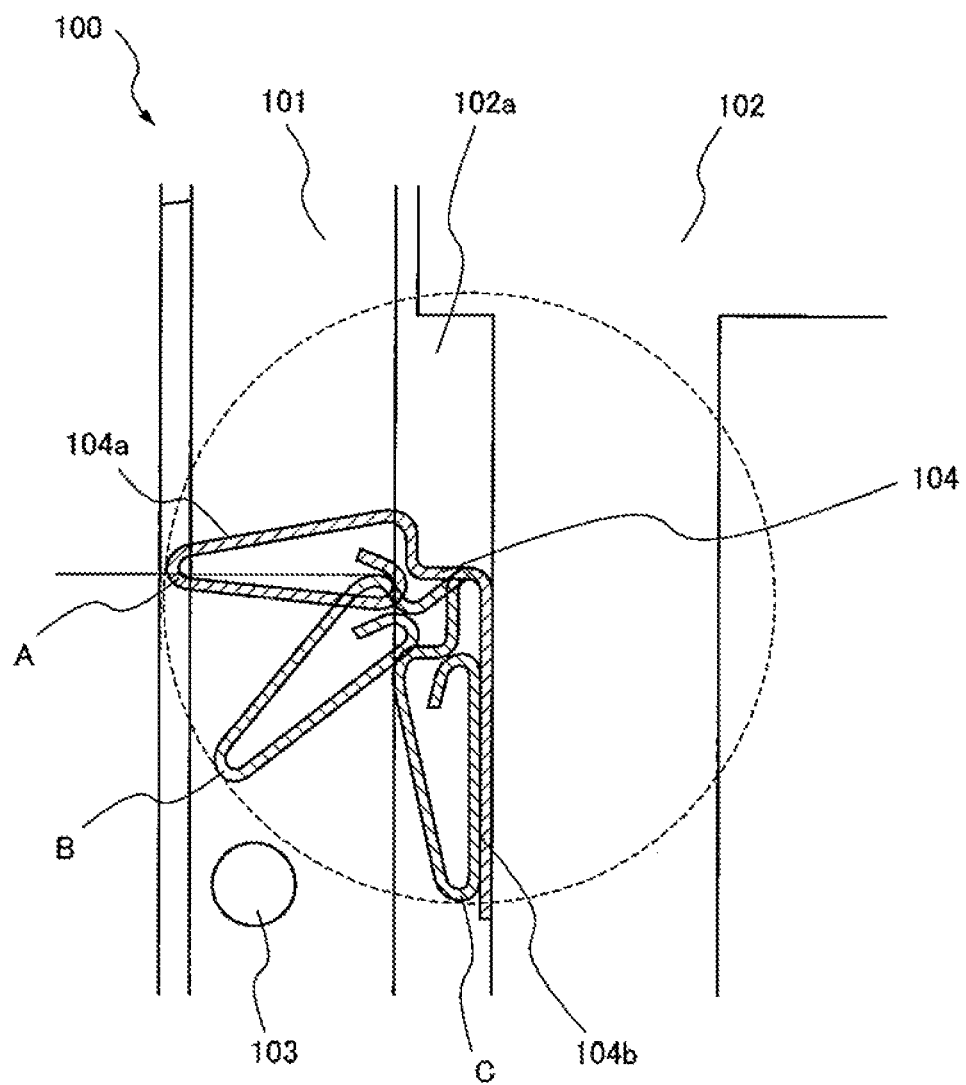
FIG. 7 is a side cross-sectional view illustrating an operation of the shielding member shown in FIG. 6 when closing a slide.
Figure 9:
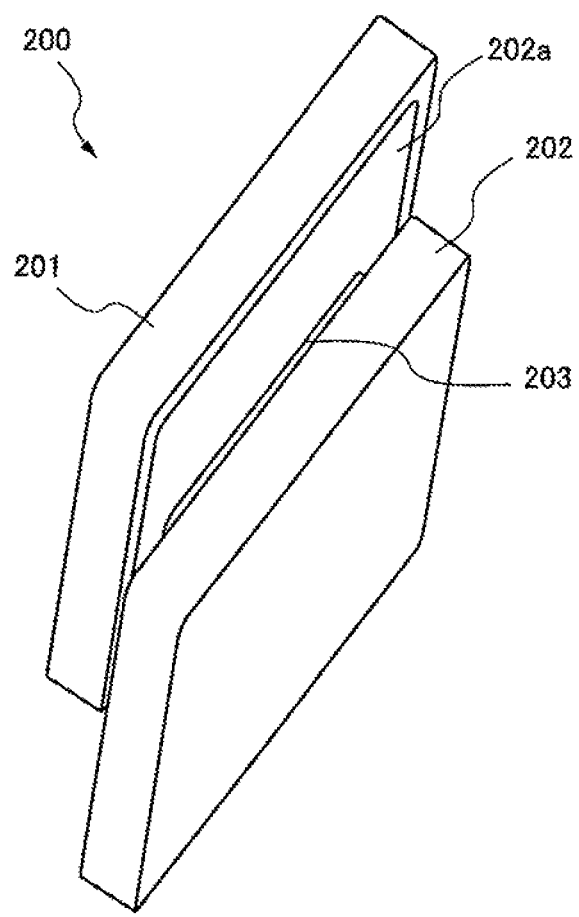
FIG. 9 is a perspective view showing the exterior appearance of a slide type mobile terminal device with torsion spring as a reference example.
Figure 10:
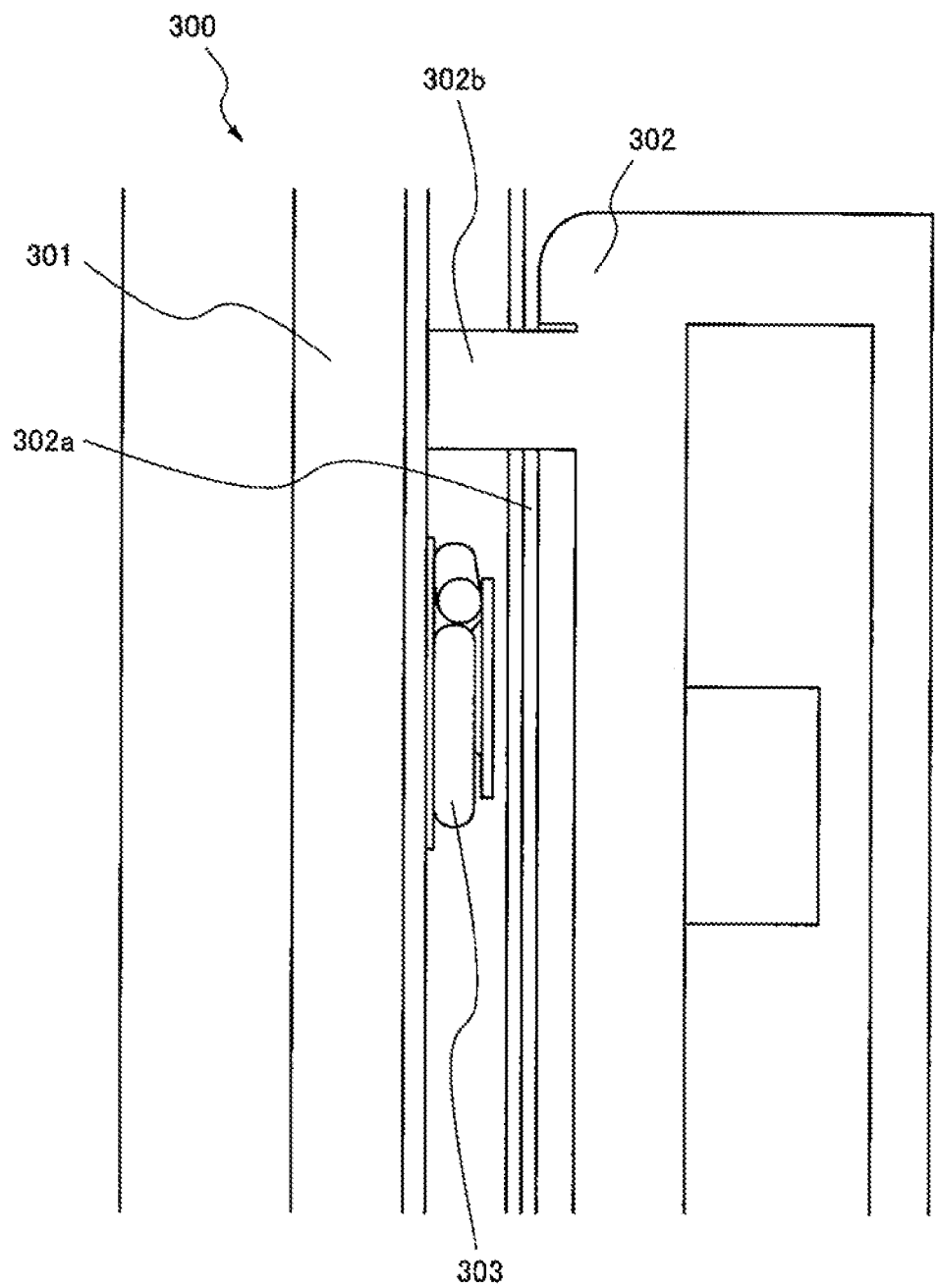
FIG. 10 is a side cross-sectional view of a reference example which has a shielding, member set for preventing a torsion spring from to being visually recognized from an opening between two cases.
Figure 11:
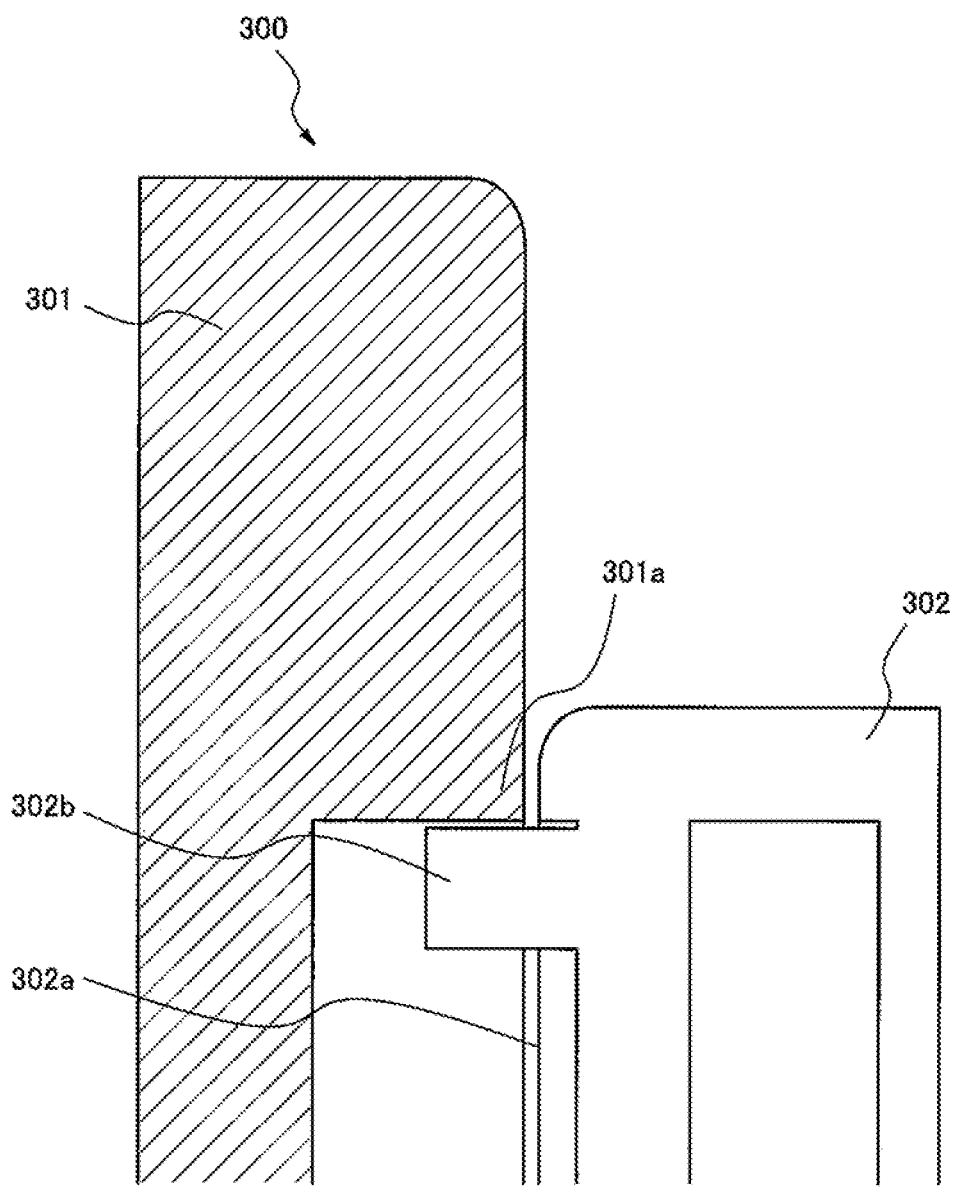
FIG. 11 is a side cross-sectional view showing a state of being impossible to be closed of two cases shown in FIG. 10.

FIG. 7 is a side cross-sectional view illustrating an operation of the shielding member shown in FIG. 6 when closing a slide.

FIG. 8 is a diagram showing the shielding member 104 shown in FIG. 6 and FIG. 7. In FIG. 8, (a) is a plan view of the shielding member. FIG. 8 (b) is a front view of the shielding member. Further. FIG. 8 (c) is a right side view of the shielding member.

As shown in FIG. 6, the mobile terminal 100 of the present embodiment has two cases, a case 101 and a case 102. Further, the mobile terminal device 100 is constituted to be opened and closed by sliding the case 101 and the case 102.

Further, a slide groove 102a is arranged between the case 101 and the case 102 of the mobile terminal device 100 in order to reserve space required for a slide.

Furthermore, a torsion spring 103 is arranged between the case 101 and the case 102. The torsion spring 103 assists a slide of the case 1 and the case 2. The mobile terminal 100 has a shielding member 104 which is formed by bending a flat plate to a shape of described hereinafter. The shielding member 104 conceals the torsion spring 103 which is in the gap between the case 101 and the case 102, in order to prevent the appearance to be visually recognized. The shielding member 104 may be made of metal or resin.

The shielding member 104 includes a movable part 104a and a supporting shaft part 104b as shown in FIG. 7 and FIG. 8. The supporting shaft part 104b is fixed to the case 102. On the other hand, the movable plate part 104a moves to change the angle with the supporting shaft part 104b according to the slide situation of the case 101 and the case 102. That is, the movable part 4a and the supporting shaft part 4b are constituted to have flexibility. Accordingly, the shielding member 104 is transformed according to the opening and closing of a slide of the case 101 and the case 102.

When the case 101 and the case 102 are in an open state, the moving part 104a is in the position A shown in FIG. 7. Then, the shielding member 104 conceals the torsion spring 103 in order to prevent the appearance to be visually recognized. When the case 101 and the case 102 slide and become a close state, the movable part 104a is pushed by a shoulder part 101a of the case 101, and bends. Then, the moving part 104a is transformed by moving from the position A to position B and position C. On the other hand, when the case 101 and the case 102 slide and being changed from a close state to an open state, the movable part 104a is transformed by moving from position C to position B and position A because of a spring characteristics of the movable part 104a and the supporting shaft part 104b.

According to the present embodiment, the movable part 104a is not a simple flat plate shape, but being formed to have a smooth surface which touches the case 101 or the shoulder part 101a thereof, by bending the flat plate shape. As a result, the opening and closing of the cases 101 and 102 with a smooth slide can be realized without being hooked.

As described above, in the present embodiment, the shielding member 104 conceals an opening when two cases slide and open. Therefore, a torsion spring does not expose to the exterior appearance. Thus, advantage on the design can be realized by a cheap configuration.

Further, a slide can be opened and closed while concealing a torsion spring.

Further, in the present embodiment, the movable part 104a is in a shape of bended flat plate shape. Therefore, a smoother slide becomes possible compared with the second embodiment.

Further, although a mobile terminal device slides vertically in the present embodiment, it is not limited thereto. That is, it may be a mobile terminal device which slides sideways.

Further, a plurality of shielding members 4 may be used to one case.

Furthermore, although a torsion spring is used in the present embodiment, it is not limited thereto. That is other springs may be used.

Other Embodiment

A slide device of other embodiment of the present invention will be described.

A slide device in the present embodiment has two cases, a spring and a shielding member as in the first embodiment.

The shielding member of the present embodiment may transform according to the opening and closing of two cases.

The spring of the present embodiment may be a torsion spring.

The shielding member of the present embodiment may be a member with flexibility.

Further, one end of the shielding member of the present embodiment may be fixed to one of two cases. Furthermore, the other end of the shielding member may have a smooth surface which touches the other of two cases.

Further, the shielding member of the present embodiment may be a flat plate shape.

Further, the shielding member of the present embodiment may be in an L shape.

Further, according to the present embodiment, for example, a slide device wherein a slide can be opened and closed while concealing a torsion spring can be provided.

That is, according to the present embodiment, for example, an exterior problem that a torsion spring is seen from a gap of a slide can be settled because a torsion spring is being concealed by a shielding member which is transformed according to the opening and closing of a slide.

Further, according to the present embodiment, for example, a gap between the cases which could not be decorated conventionally can be utilized as an area available to being design by decorating a shielding member.

Further, according to the present embodiment, for example, there is an advantage that a shielding member can be composed cheaply because it is made from a sheet material.

While the slide device in this invention has been particularly shown and described with reference to exemplary embodiments thereof, the invention is not limited to these embodiments. It will be understood by those of ordinary skill in the in that various changes in form and details may be made therein without departing from the spirit and scope of the present invention as defined by the claims.

Further, within the scope of claims of the present invention, numerous combinations, substitution or selection of various disclosure elements are possible.

Additional theme, purpose and the development form of the present invention are also revealed from all disclosure matters of the present invention including the claims.

INDUSTRIAL APPLICABILITY

In the above mentioned description, the slide device of the present invention is applied to a mobile terminal device. However, it is not limited thereto. That is, a slide device of the present invention can be applied to an apparatus and equipment or the like which makes two members slide.

The invention claimed is:

1. A slide device comprising:
a first case;
a second case;
a spring which is arranged between the first case and the second case; and
a shielding member which conceals the spring, wherein
the shielding member is arranged in a position to conceal the spring when the first case and the second case are in an open state and is arranged between the first case and the second case when the first case and the second case are in a close state, and is transformed according to the open and the close state of the first and the second cases.

2. The slide device according to claim 1, wherein the spring is a torsion spring.

3. The slide device according to claim 1, wherein the shielding member includes a member with flexibility.

4. The slide device according to claim 1, wherein the shielding member includes a movable part and a supporting shaft part and is fixed to the first case.

5. The slide device according to claim 4, wherein the movable part and the supporting shaft part are the flat plate shapes respectively.

6. The slide device according to claim 5, wherein the movable part and the supporting shaft part form L shape.

7. The slide device according to claim 4, wherein the movable part includes a smooth surface to which the second case touches.

* * * * *